(12) United States Patent
Gumpoltsberger

(10) Patent No.: US 7,575,533 B2
(45) Date of Patent: Aug. 18, 2009

(54) MULTI-SPEED TRANSMISSION

(75) Inventor: Gerhard Gumpoltsberger, Friedrichshafen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 212 days.

(21) Appl. No.: 11/705,073

(22) Filed: Feb. 9, 2007

(65) Prior Publication Data
US 2008/0125269 A1    May 29, 2008

(30) Foreign Application Priority Data
Feb. 14, 2006    (DE) .................. 10 2006 006 639

(51) Int. Cl.
*F16H 3/44* (2006.01)
(52) U.S. Cl. ...................... 475/280; 475/290
(58) Field of Classification Search .......... 475/275–291
See application file for complete search history.

(56) References Cited

U.S. PATENT DOCUMENTS

| | | | |
|---|---|---|---|
| 4,395,925 A | | 8/1983 | Gaus |
| 4,683,776 A | * | 8/1987 | Klemen ................... 475/286 |
| 5,106,352 A | | 4/1992 | Lepelletier |
| 5,730,678 A | * | 3/1998 | Larkin ..................... 475/81 |
| 5,944,629 A | * | 8/1999 | Park ....................... 475/279 |
| 6,139,463 A | | 10/2000 | Kasuya et al. |
| 6,558,287 B2 | | 5/2003 | Hayabuchi et al. |
| 6,572,507 B1 | | 6/2003 | Korkmaz et al. |
| 6,634,980 B1 | | 10/2003 | Ziemer |
| 6,860,831 B2 | | 3/2005 | Ziemer |
| 7,018,319 B2 | | 3/2006 | Ziemer |
| 2006/0166779 A1 | * | 7/2006 | Klemen ................... 475/280 |
| 2007/0202982 A1 | * | 8/2007 | Gumpoltsberger ........ 475/275 |

FOREIGN PATENT DOCUMENTS

| | | |
|---|---|---|
| DE | 29 36 969 | 4/1981 |
| DE | 199 12 480 | 9/2000 |
| DE | 199 49 507 | 4/2001 |
| DE | 101 15 983 | 10/2002 |
| DE | 101 15 987 | 10/2002 |
| DE | 102 13 820 | 10/2002 |
| EP | 0 434 525 | 6/1991 |

* cited by examiner

*Primary Examiner*—Roger Pang
(74) *Attorney, Agent, or Firm*—Davis & Bujold, P.L.L.C.

(57) ABSTRACT

A multi-speed transmission with nine forward gears and one reverse gear, four planetary gear sets, seven shafts and six shifting elements. The input shaft is coupled to gear sets (P2, P3); shaft (3) is coupled to the carrier of gear set (P2) and the ring of gear set (P1) and is coupleable to the housing (G); shaft (4) is coupled to the ring of gear set (P3), the carrier of gear set (P4) and is coupleable to the housing; shaft (5) couples with gear set (P4) and the ring of gear set (P2) couples the housing (G), and via clutch (57) to shaft (7), which is coupled to the carrier of gear set (P1); shaft (6) is coupled to the carrier of gear set (P3) and coupleable via clutch (26) to output shaft which couples the ring of gear set (P4); the sun of gear set (P1) couples the housing.

21 Claims, 5 Drawing Sheets

| | 1. | 2. | 3. | 4. | 5. | 6. | 7. | 8. | 9. | R1. |
|---|---|---|---|---|---|---|---|---|---|---|
| i_G: | 5.44 | 3.40 | 2.53 | 1.77 | 1.30 | 1.00 | 0.80 | 0.68 | 0.61 | -4.52 |
| phi: | 8.99 | 1.60 | 1.35 | 1.43 | 1.36 | 1.30 | 1.25 | 1.18 | 1.12 | -0.83 |
| 103 | x | | x | | | | | x | | |
| 104 | x | x | | | | | | | | x |
| 105 | | | | x | | | | x | | |
| 14 | | | | | | x | x | x | x | |
| 26 | | x | x | x | x | x | | | | |
| 57 | | | | | x | | x | | | x |

| | 1. | 2. | 3. | 4. | 5. | 6. | 7. | 8. | 9. | R1. |
|---|---|---|---|---|---|---|---|---|---|---|
| i_G: | 5,44 | 3,40 | 2,53 | 1,77 | 1,30 | 1,00 | 0,80 | 0,68 | 0,61 | -4,52 |
| phi: | 8,99 | 1,60 | 1,35 | 1,43 | 1,36 | 1,30 | 1,25 | 1,18 | 1,12 | -0,83 |
| |03| | x | | x | | | | | | x | |
| |04| | x | x | | | | | | | | x |
| |05| | | | | x | | | | x | | |
| |16| | | | | | | x | x | x | x | |
| |26| | | x | x | x | x | x | | | | |
| |57| | | | | | x | | x | | | x |

| | 1. | 2. | 3. | 4. | 5. | 6. | 7. | 8. | 9. | R1. |
|---|---|---|---|---|---|---|---|---|---|---|
| i_G: | 5.44 | 3.40 | 2.53 | 1.77 | 1.30 | 1.00 | 0.80 | 0.68 | 0.61 | -4.52 |
| phi: | 8.99 | 1.61 | 1.36 | 1.44 | 1.36 | 1.29 | 1.23 | 1.17 | 1.13 | -0.83 |
| |03| | x | | x | | | | | x | | |
| |04| | x | x | | | | | | | | x |
| |05| | | | | x | | | | x | | |
| |46| | | | | | | x | x | x | x | |
| |26| | | x | x | x | x | x | | | | |
| |57| | | | | | x | | x | | | x |

MULTI-SPEED TRANSMISSION

This application claims priority from German Patent Application Serial No. 10 2006 006 639.1 filed Feb. 14, 2006.

FIELD OF THE INVENTION

The invention concerns a multi-speed transmission of planetary construction, in particular an automatic transmission for a motor vehicle.

BACKGROUND OF THE INVENTION

According to the prior art, automatic transmissions, in particular for motor vehicles, comprise planetary gear sets, which are shifted by means of friction elements or shifting elements, such as possibly clutches and brakes, and are usually connected to a starting element that is subjected to a slip effect and is selectively provided with a lockup clutch, such as a hydrodynamic torque converter or a fluid clutch.

A transmission such as this is disclosed in EP 0 434 525 A1. It comprises essentially an input shaft and an output shaft, which are arranged parallel to each other, a double planetary gear set arranged concentrically with the output shaft, and five shifting elements in the form of three clutches and two brakes, whose selective engagement, in pairs, determines the various gear ratios between the input shaft and the output shaft. The transmission comprises a front-mounted gear set and two power paths, so that six forward gears can be achieved by selectively engaging different pairs of the five shifting elements.

Two clutches are required for the transmission of torque from the front-mounted gear set to two elements of the double planetary gear set with the first power path. These are arranged in the direction of power flow essentially behind the front-mounted gear set in the direction of the double planetary gear set. Another clutch is provided with the second power path, which detachably connects this to another element of the double planetary gear set. The clutches are arranged in such a way herein that the inner disk carrier forms the output.

A compact multi-speed transmission of planetary construction, in particular for a motor vehicle, which comprises two planetary gear sets and one front-mounted gear set, as well as three clutches and two brakes, is also known from U.S. Pat. No. 6,139,463. In this known multi-speed transmission, two clutches C-1 and C-3 are provided in a first power path for transmitting torque from the front-mounted gear set to the two planetary gear sets. Here, the outer disk carrier or the cylinder or piston and pressure compensating side of the clutch C-3 is connected to a first brake B-1. In addition, the inner disk carrier of the third clutch C-3 is connected to the cylinder or piston and pressure compensating side of the first clutch C-1, wherein the inner disk carrier of the first clutch C-1 is arranged on the output side and is connected to a sun gear of the third planetary gear set.

From DE 199 49 507 A1 of the applicant a multi-speed transmission is additionally known, in which two non-shiftable front-mounted gear sets are provided on the input shaft, which generate two rotational speeds on the output side, which, in addition to the rotational speed of the input shaft, can be optionally shifted to a shiftable double planetary gear set that acts on the output shaft by selectively engaging the shifting elements that are used in such a way that in order to shift from one gear to the next higher or lower gear, only one shifting element of the two just actuated shifting elements has to be activated or deactivated.

From DE 199 12 480 A1 an automatically shiftable motor vehicle transmission is known, which comprises three single carrier planetary gear sets as well as three brakes and two clutches for shifting between six forward gears and one reverse gear, and one input shaft and one output shaft. The automatically shiftable motor vehicle transmission is configured in such a way that the input shaft is connected directly to the sun gear of the second planetary gear set and the input shaft can be connected to the sun gear of the first planetary gear set by way of the first clutch and/or to the carrier of the first planetary gear set by way of the second clutch. In addition or as an alternative, the sun gear of the first planetary gear set can be connected to the housing of the transmission by way of the first brake and/or the carrier of the first planetary gear set can be connected to the housing by way of the second brake and/or the sun gear of the third planetary gear set can be connected to the housing by way of the third brake.

From DE 102 13 820 A1 an automatic multi-speed transmission is further known, which comprises a first input path T1 of a first gear ratio; an input path T2, which has a greater gear ratio than the input path T1; a planetary gear set with four elements, wherein the four elements are arranged in the direction of power flow in the sequential order of a first element, a second element, a third element, and a fourth element; a clutch C-2, which transmits a rotation of the input path T2 to the first element S3; a clutch C-1, which transmits the rotation from the input path T2 to the fourth element S2; a clutch C-4, which transmits a rotation from the input path T1 to the first element; a clutch C-3, which transmits the rotation from the input path T1 to the second element C3; a brake B-1, which induces the engagement of the fourth element; a brake B-2, which induces the engagement of the second element; and an output element, which is coupled to the third element R3.

Within the scope of DE 101 15 983 A1 of the applicant a multi-speed transmission is described, which comprises an input shaft connected to a front-mounted gear set, an output shaft connected to a rear-mounted gear set, and a maximum of seven shifting elements, whose selective shifting allows at least seven forward gears to be shifted without a range shift. The front-mounted set is comprised of a front-mounted planetary gear set or a maximum of two non-shiftable front-mounted planetary gear sets that are coupled to the first front-mounted planetary gear set, wherein the rear-mounted set is designed as a two-carrier, four-shaft transmission with two shiftable, rear-mounted planetary gear sets, and has four free shafts. The first free shaft of this two-carrier, four-shaft transmission is connected to the first shifting element; the second free shaft is connected to the second and third shifting elements; the third free shaft is connected to the fourth and fifth shifting elements; and the fourth free shaft is connected to the output shaft. For a multi-speed transmission with a total of six shifting elements, it is proposed according to the invention to additionally connect the third free shaft or the first free shaft of the rear-mounted set to a sixth shifting element. For a multi-speed transmission with a total of seven shifting elements, it is proposed according to the invention to additionally connect the third free shaft to a sixth shifting element D' and to additionally connect the first free shaft to a seventh shifting element.

A multi-speed transmission with at least seven gears is furthermore described within the scope of DE 101 15 987 A1 of the applicant. This transmission consists, in addition to the input shaft and the output shaft, of a non-shiftable front-mounted gear set and a shiftable rear-mounted gear set in the form of a two-carrier, four-shaft transmission. The front-mounted gear set consists of a first planetary gear set, which offers, in addition to the input rotational speed of the input shaft, a second rotational speed, which can be optionally applied on the rear-mounted gear set. The rear-mounted gear set consists of two shiftable, planetary gear sets, which can shift into at least seven gears using the six shifting elements, whereupon two power paths are formed. Range shifts are advantageously always prevented during each shifting operation. A 9-gear multi-speed transmission is furthermore known from DE 29 36 969 A1; it comprises eight shifting elements and four gear sets, wherein one gear set serves as the front-mounted transmission and the main transmission has a Simpson set and another gear set serving as the reversing transmission.

Automatically shiftable motor vehicle transmissions of planetary construction have been described multiple times in the prior art and are the permanent subject of development and improvement. Thus these transmissions reportedly have a sufficient number of forward gears as well as one reverse gear and a gear ratio spread that is well suited for motor vehicles, with a high overall transmission ratio spread as well as favorable progressive ratios. They should further make possible a high starting gear ratio in the forward direction and contain a direct gear, and should be suitable for use in both passenger vehicles and commercial vehicles. In addition, these transmissions should require a low construction expenditure, in particular a small number of shifting elements, and should prevent double-shifting during sequential shifting, so that only one shifting element is changed when shifting into defined gear groups.

SUMMARY OF THE INVENTION

It is the object of the invention to propose a multi-speed transmission of the kind described above, in which the construction expenditure is optimized and, in addition, the efficiency in the main travel gears is improved in terms of drag and gearing losses. A low torque should act on the shifting elements and planetary gear sets, and the rotation speeds of the shafts, shifting elements, and planetary gear sets should also be kept as low as possible with the multi-speed transmission of the invention. The number of gears as well as the spread of transmission ratios should be increased, so that at least nine forward gears and at least one reverse gear can be advantageously realized. The transmission of the invention should furthermore be suited for any vehicle design, especially for a front-transverse arrangement. It is another object of the invention to disclose a multi-speed transmission, which has a particularly compact design.

A multi-speed transmission of planetary construction is consequently proposed, which comprises an input shaft and an output shaft, which are arranged in a housing. At least four planetary gear sets, which in the following will be called the first, second, third and fourth planetary gear sets, at least seven rotatable shafts, which in the following will be called the input shaft, the output shaft, the third, fourth, fifth, sixth and seventh shafts, as well as at least six shifting elements, comprising brakes and clutches, are provided, whose selective engagement induces different gear ratios between the input shaft and the output shaft, so that preferably nine forward gears and one reverse gear can be realized.

According to the invention, the input shaft is permanently connected to the sun gear of the second planetary gear set and to the sun gear of the third planetary gear set, wherein the third shaft is permanently connected to the carrier of the second planetary gear set and to the ring gear of the first planetary gear set, and can be coupled to the housing by way of a brake, while the fourth shaft is permanently connected to the ring gear of the third planetary gear set and to the carrier of the fourth planetary gear set, and can be coupled to the housing by way of a brake.

Further, the fifth shaft is permanently connected to the sun gear of the fourth planetary gear set and to the ring gear of the second planetary gear set, can be coupled to the housing by way of a brake, and can be releasably connected by way of a clutch to the seventh shaft, which is permanently connected to the carrier of the first planetary gear set; wherein the sixth shaft is permanently connected to the carrier of the third planetary gear set and can be releasably connected by way of a clutch to the output shaft, which is permanently connected to the ring gear of the fourth planetary gear set; and wherein the sun gear of the first planetary gear set is connected in a slip free manner to the housing.

Either the input shaft and the fourth shaft or the input shaft and the sixth shaft or the fourth and the sixth shafts can be releasably connected to each other by way of a clutch according to the invention.

The configuration of the multi-speed transmission according to the invention induces suitable gear ratios, particularly for passenger vehicles, as well as a significant increase in the overall transmission ratio spread of the multi-speed transmission, whereby an improvement in driving comfort and a significant decrease in fuel consumption are brought about.

Furthermore, the construction expenditure is considerably reduced with the multi-speed transmission according to the invention due to the low number of shifting elements, preferably three brakes and three clutches. It is advantageously possible with the multi-speed transmission according to the invention to carry out a startup with a hydrodynamic converter, an external starting clutch, or with other suitable external starting elements. It is also conceivable to enable a starting procedure with a starting element that is integrated into the transmission. A shifting element, which is actuated in the first forward gear and in the reverse gear, is preferably suitable.

Beyond that, the multi-speed transmission according to the invention achieves a good efficiency in the main travel gears in terms of drag and gearing losses.

A low torque is furthermore present in the shifting elements and in the planetary gear sets of the multi-speed transmission, whereby the wear is advantageously reduced in the multi-speed transmission. The low torque enables a correspondingly small transmission size, whereby the required installation space and corresponding costs are reduced. Aside from this, low rotational speeds are also present at the shafts, the shifting elements, and the planetary gear sets.

Moreover, the transmission according to the invention is designed in such a way that an adaptation to different drive train configurations, both in the power flow direction and also from a spatial point of view, is made possible; consequently, it is possible, for example, to provide the input and output on the same side of the housing.

BRIEF DESCRIPTION OF THE DRAWINGS

The invention will be explained in more detail in the following based on the examples represented in the drawings, wherein.

DETAILED DESCRIPTION OF THE PREFERRED EMBODIMENTS

Figures 1, 2:
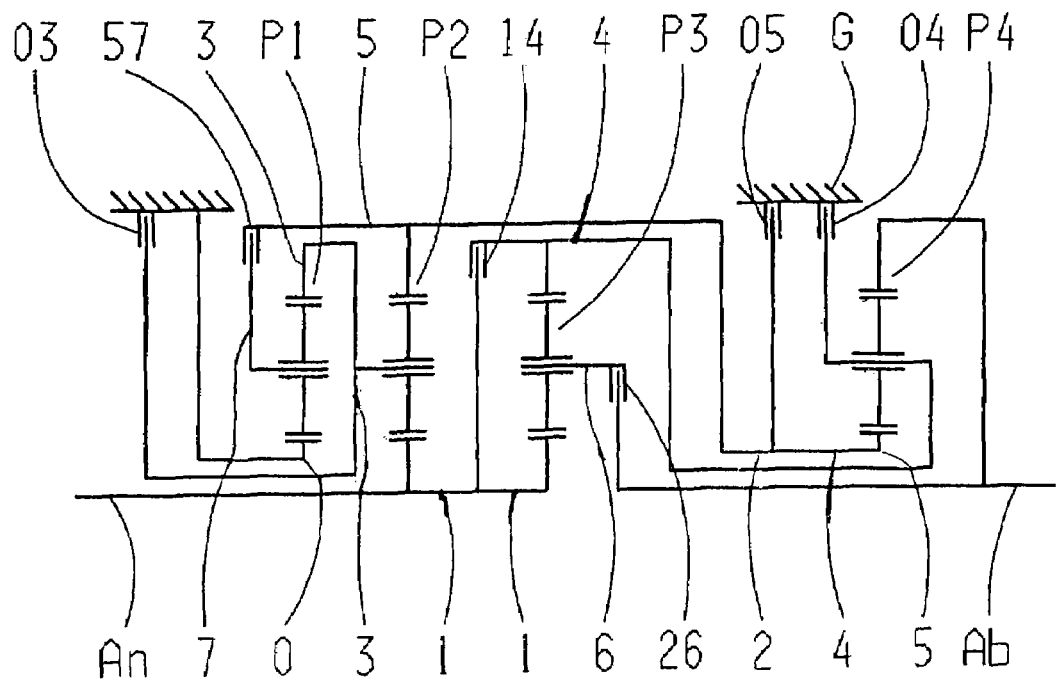
FIG. 1 shows a schematic view of a preferred embodiment of a multi-speed transmission according to the invention.
FIG. 2 shows an exemplary schematic diagram of a multi-speed transmission according to FIG. 1.

In FIG. 1 a multi-speed transmission according to the invention is depicted, comprising an input shaft 1 and an output shaft 2, which are arranged in a housing G. Four planetary gear sets P1, P2, P3 and P4 are provided, which are configured as negative planetary gear sets and are preferably arranged in the sequential order of P1, P2, P3, P4 one after the other in an axial direction or in the direction of power flow.

As is shown in FIG. 1, six shifting elements, namely three brakes 03, 04, 05 and three clutches 14, 26 and 57, are provided. The clutches are preferably configured as disk clutches.

Using these shifting elements, a selective shifting of nine forward gears and one reverse gear can be realized. The multi-speed transmission according to the invention has a total of seven rotatable shafts, namely the shafts 1, 2, 3, 4, 5, 6 and 7.

In the multi-speed transmission of FIG. 1, it is provided according to the invention that the input is carried out by means of the shaft 1, which is permanently connected to the sun gear of the second planetary gear set P2, and to the sun gear of the third planetary gear set P3, wherein the shaft 3 is permanently connected to the carrier of the second planetary gear set P2 and to the ring gear of the first planetary gear set P1 and can be coupled to the housing G by way of a brake 03; wherein the shaft 4 is permanently connected to the ring gear of the third planetary gear set P3 and to the carrier of the fourth planetary gear set P4 and can be coupled to the housing by way of the brake 04. In addition, the shaft 5 is permanently connected to the sun gear of the fourth planetary gear set P4 and to the ring gear of the second planetary gear set P2, and can be coupled to the housing G by way of the brake 05 and can be releasably connected to the shaft 7 by way of a clutch 57, which is permanently connected to the carrier of the first planetary gear set P1; wherein the shaft 6 is permanently connected to the carrier of the third planetary gear set P3, and can be releasably connected to the output shaft 2 by way of a clutch 26, which is permanently connected to the ring gear of the fourth planetary gear set P4; the sun gear of the first planetary gear set P1 is connected in a slip free manner to the housing (shaft 0). As can be seen in the figure, the shafts 1 and 4 can be mutually releasably connected by way of a clutch 14.

The spatial arrangement of the shifting elements can be freely selected and is limited only by the dimensions and the outer shape.

In FIG. 2 an exemplary schematic diagram of a multi-speed transmission according to FIG. 1 is depicted. Two shifting elements are engaged for each gear. The schematic diagram shows as an example the respective gear ratios i of the individual gear ratios and the progression ratios phi to be determined therefrom. FIG. 2 shows that double shifting or range shifts are prevented in the sequential shifting operation, since two adjoining gear steps utilize one shifting element.

The first gear is achieved by engaging the brakes 03 and 04; the second gear is achieved by engaging the brake 04 and the clutch 26; the third gear is achieved by engaging the clutch 26 and the brake 03; and the fourth gear is achieved by engaging the clutch 26 and the brake 05. Moreover, the fifth gear is achieved by engaging the clutches 26 and 57; the sixth gear is achieved by engaging the clutch 14 and the clutch 26; the seventh gear is achieved by engaging the clutch 14 and the clutch 57; the eighth gear is achieved by engaging the brake 05 and the clutch 14; and the ninth gear is achieved by engaging the brake 03 and the clutch 14. As can be seen in the schematic diagram, the reverse gear is achieved by engaging the brake 04 and the clutch 57.

Figures 3, 4:
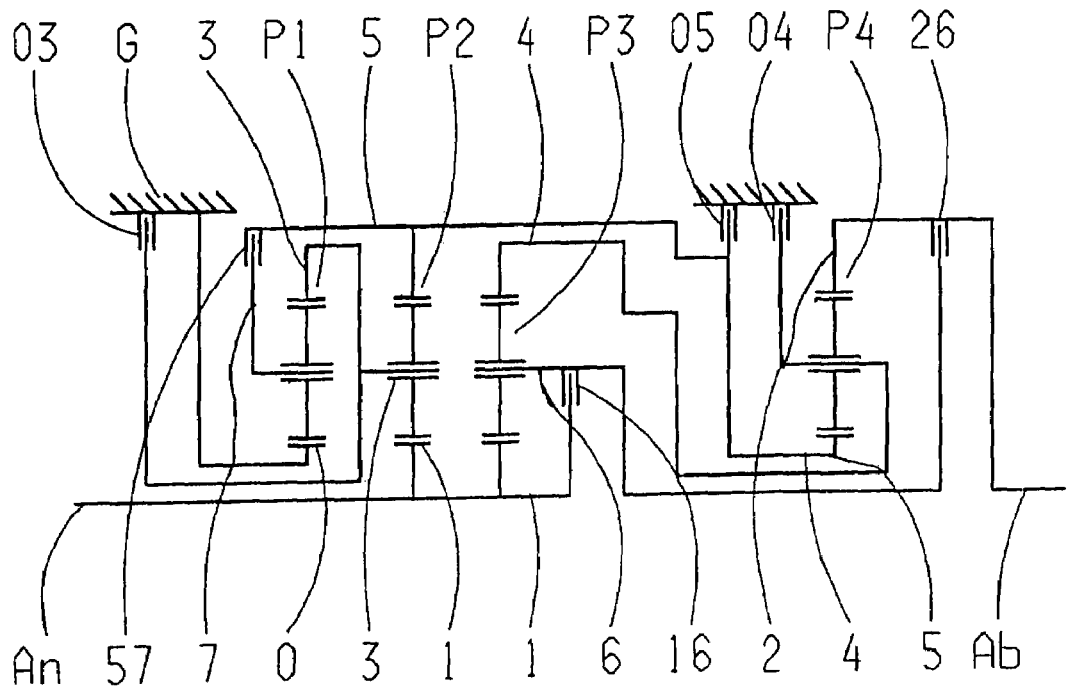
FIG. 3 shows a schematic view of another preferred embodiment of a multi-speed transmission according to the invention.
FIG. 4 shows an exemplary schematic diagram of a multi-speed transmission according to FIG. 3.

The exemplary embodiment shown in FIG. 3 differs from the multi-speed transmission according to FIG. 1 in that the input shaft 1 and the shaft 6 can be mutually releasably connected by way of a clutch 16, while the releasable connection between the input shaft 1 and the shaft 4 is omitted. The corresponding schematic diagram is shown in FIG. 4 and corresponds to the schematic diagram according to FIG. 2, with the difference that the clutch 14 is replaced by the clutch 16.

Figures 5, 6:
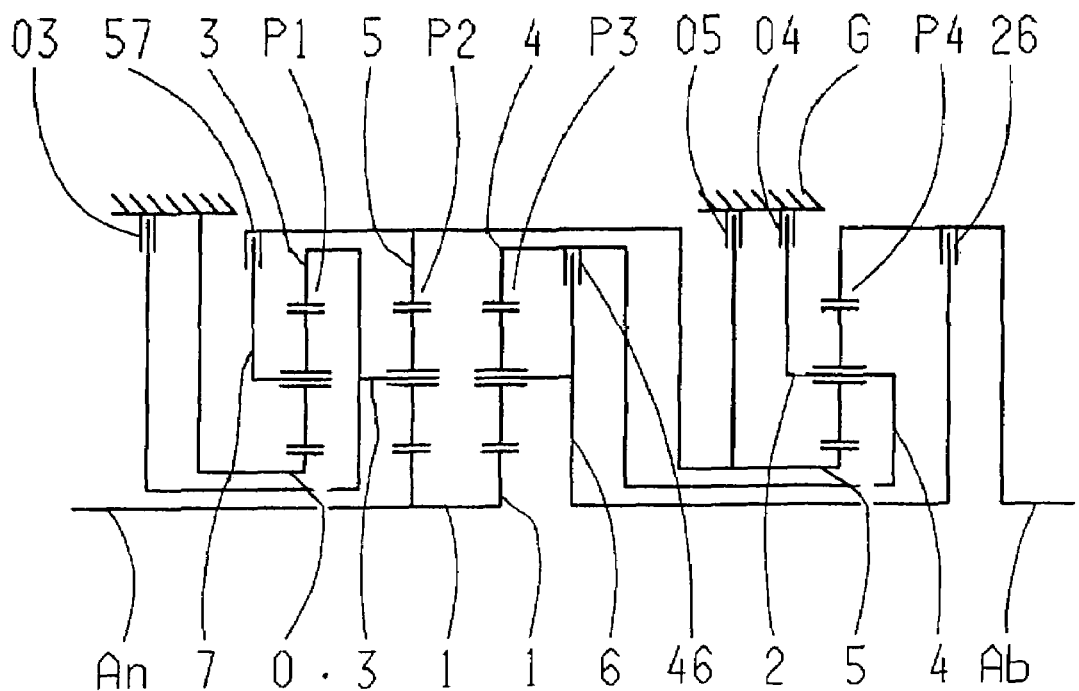
FIG. 5 shows a schematic view of a further preferred embodiment of a multi-speed transmission according to the invention.
FIG. 6 shows an exemplary schematic diagram of a multi-speed transmission according to FIG. 5.

The exemplary embodiment shown in FIG. 5 differs from the multi-speed transmission according to FIG. 1 in that the shaft 4 and the shaft 6 can be mutually releasably connected by way of a clutch 46, while the releasable connection between the input shaft 1 and the shaft 4 is omitted. The corresponding schematic diagram is shown in FIG. 6 and corresponds to the schematic diagram according to FIG. 2, with the difference that the clutch 14 is replaced by the clutch 46.

A startup is possible according to the invention with an integrated shifting element (IAK). A shifting element, which is required in the first gear and in the reverse gear without reversal of the direction of rotation, for example the brake 04, is particularly suitable herein.

Different gear progressions can also be achieved according to the invention with the same transmission diagram, depending on the shifting logic, so that a variation that is specifically adapted to the application and/or vehicle is made possible.

Figure 7:
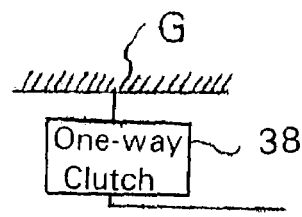
FIG. 7 is a diagrammatic view of an embodiment of the inventive multi-speed transmission having a one-way clutch.

In addition, it is possible, as shown in FIG. 7 to provide additional one-way clutches 38 at each suitable point of the multi-speed transmission, for example between a shaft and the housing or in order to connect two shafts, if required.

Figure 12:
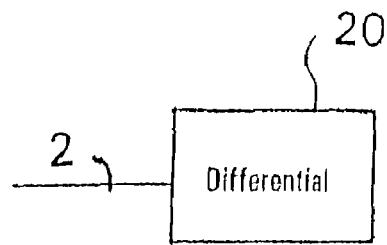
FIG. 12 is a diagrammatic view of an embodiment of the inventive multi-speed transmission having a differential.

An axle differential and/or a distributor differential 20 can be arranged at the input side or at the output side according to the invention, as shown in FIG. 12.

Figure 11:
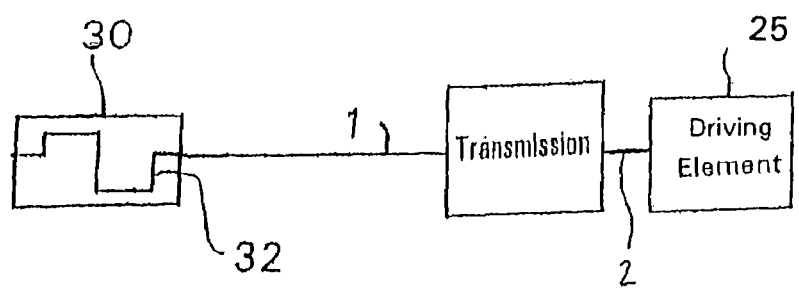
FIG. 11 is a diagrammatic view of another embodiment of the inventive multi-speed transmission with the crankshaft of the drive motor fixed to the input shaft of the multi-speed transmission and the driving element located behind the multi-speed transmission.
Figure 13:
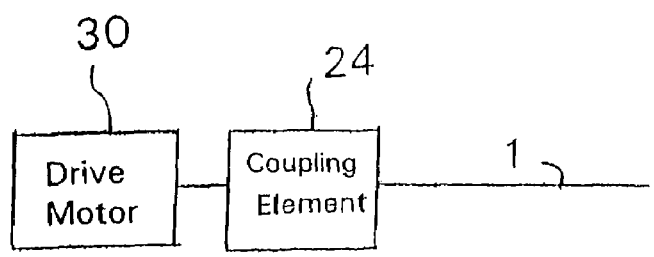
FIG. 13 is a diagrammatic view of an embodiment of the inventive multi-speed transmission with a coupling element and a drive motor.
Figure 14:
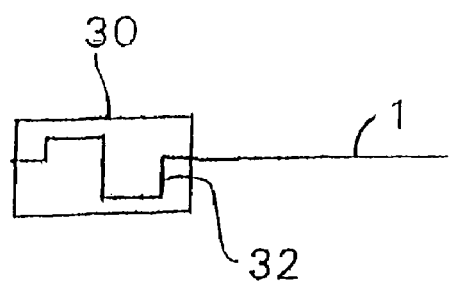
FIG. 14 is a diagrammatic view of an embodiment of the inventive multi-speed transmission with a crankshaft of the drive motor fixed to an input shaft of the multi-speed transmission.

Within the scope of an advantageous further development, as shown in FIG. 13, the input shaft 1 can be separated, if required, from a drive motor 30 by means of a coupling element 24, while a hydrodynamic converter, a hydraulic clutch, a dry starting clutch, a wet starting clutch, a magnetic powder clutch, or a centrifugal clutch can be used as the coupling element 24. It is also feasible, as shown in FIG. 11, to arrange a driving element 25 behind the transmission in the power flow direction, in which case, as shown in FIG. 14 the input shaft 1 is permanently connected to the crankshaft 32 of the drive motor 30.

Figure 15:
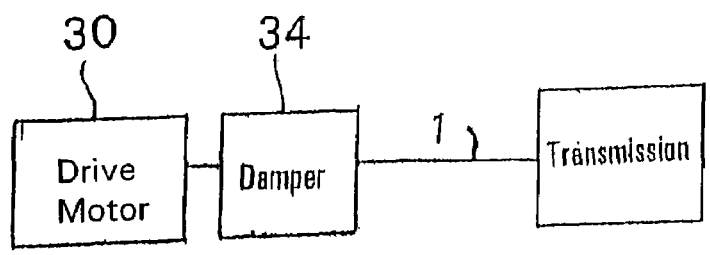
FIG. 15 is a diagrammatic view of an embodiment of the inventive multi-speed transmission having the drive motor communicating with a damper.

The multi-speed transmission according to the invention, as shown in FIG. 15 also enables the arrangement of a torsional vibration damper 34 between the drive motor 30 and the transmission.

Figure 9:
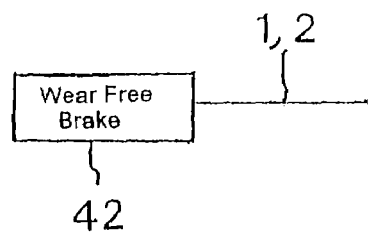
FIG. 9 is a diagrammatic view of a preferred design of the inventive multi-speed transmission having a wear-free brake.
Figure 10:
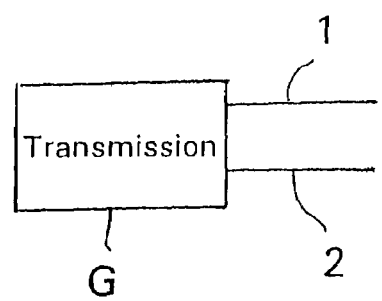
FIG. 10 is a diagrammatic view of a further embodiment of the invention with the input and the output being provided on the same side of the housing.
Figure 16:
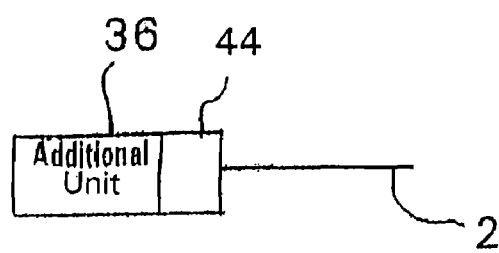
FIG. 16 is a diagrammatic view of an embodiment of the inventive multi-speed transmission with a power take-off for driving an additional unit.

Within the scope of a further embodiment of the invention, shown in FIG. 9, a wear-free brake 42, for example a hydraulic or electric retarder or the like, can be arranged on each shaft, preferably on the input shaft 1 or the output shaft 2, which is of particular importance for use in commercial vehicles. In addition, as shown in FIG. 16 an auxiliary drive 44 can be provided in order to drive additional units 36 on each shaft, preferably on the input shaft 1 or the output shaft 2. Additionally, as shown in FIG. 10, the input and output shafts are provided on the same side of the housing.

The shifting elements that are used can be configured as power shifting clutches or brakes. Non-positive clutches or brakes, such as, for example, disk clutches, band brakes and/or cone clutches, can especially be used. Moreover, positive brakes and/or clutches, such as, for example, synchronizing mechanisms or claw clutches, can also be used as the shifting elements.

Figure 8:
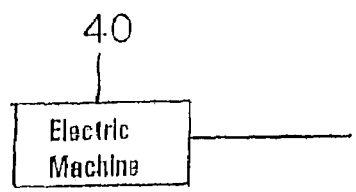
FIG. 8 is a diagrammatic view of an embodiment of the inventive multi-speed transmission with ane electric machine.

Another advantage of the multi-speed transmission presented herein and shown in FIG. 8 is that an electric machine 40 can be mounted as a generator and/or as an additional drive engine on each shaft.

Any embodiment configuration, in particular any spatial arrangement of the planetary gear sets and the shifting elements per se as well as with respect to each other, is understood to be covered under the protective scope of the claims, as long as it is practical from a technical point of view and does not influence the function of the transmission as disclosed in the claims, even if these embodiments are not explicitly depicted in the figures or described in the disclosure.

REFERENCE SYMBOLS 1 shaft
2 shaft
3 shaft
4 shaft
5 shaft
6 shaft
7 shaft
03 brake
04 brake
05 brake
14 clutch
16 clutch
26 clutch
46 clutch
57 clutch
P1 planetary gear set
P2 planetary gear set
P3 planetary gear set
P4 planetary gear set
i gear ratio
phi progression ratio
G housing

The invention claimed is:

1. A multi-speed automatic transmission of a planetary design for a motor vehicle, the transmission comprising:
   an input shaft (1) and an output shaft (2) arranged in a housing (G);
   first, second, third, and fourth planetary gear sets (P1, P2, P3, P4), and each of the first, the second, the third, and the fourth planetary gear sets (P1, P2, P3, P4) comprising a sun gear, a carrier and a ring gear;
   at least third, fourth, fifth, sixth and seventh rotatable shafts (3, 4, 5, 6, 7) as well as at least six shifting elements (03, 04, 05, 14, 16, 26, 46, 57), comprising first, second, and third brakes (03, 04, 05) and first, second, and third, clutches (14, 16, 26, 48, 57), whose selective engagement creates different gear ratios between the input shaft (1) and the output shaft (2) so that at least nine forward gears and one reverse gear can be implemented;
   wherein the input shaft (1) is permanently connected to the sun gear of the second planetary gear set (P2) and the sun gear of the third planetary gear set (P3);
   the third shaft (3) is permanently connected to the carrier of the second planetary gear set (P2) and the ring gear of the first planetary gear set (P1), and is detachably connected, via the first brake (03), to the housing (G);
   the fourth shaft (4) is permanently connected to the ring gear of the third planetary gear set (P3) and the carrier of the fourth planetary gear set (P4), and is detachably connected, via the second brake (04), to the housing (G);
   the fifth shaft (5) is permanently connected to the sun gear of the fourth planetary gear set (P4) and the ring gear of the second planetary gear set (P2), and is detachably connected, via the third brake (05), to the housing (G), and, via the third clutch (57), to the seventh shaft (7);
   the seventh shaft (7) is permanently connected to the carrier of the first planetary gear set (P1);
   the sixth shaft (6) is permanently connected to the carrier of the third planetary gear set (P3) and detachably connected to the output shaft (2);
   the output shaft (2) is permanently connected to the ring gear of the fourth planetary gear set (P4);
   the sun gear of the first planetary gear set (P1) is fixed to the housing (G); and
   one of:
      the input shaft (1) is detachably connected, via the first clutch (14), to the fourth shaft (4);
      the input shaft (1) is detachably connected, via the first clutch (16), to the sixth shaft (6); and
      the fourth shaft (4) is detachably connected, via the first clutch (46), to the sixth shaft (6).

2. The multi-speed transmission according to claim 1, wherein the first, the second, the third, and the fourth planetary gear sets (P1, P2, P3, P4) are arranged in an axial direction in the sequential order of:
   the first planetary gear set (P1), the second planetary gear set (P2), the third planetary gear set (P3) and the fourth planetary gear set (P4).

3. The multi-speed transmission according to claim 1, wherein the planetary first, the second, the third, and the fourth planetary gear sets (P1, P2, P3, P4) are negative planetary gear sets.

4. The multi-speed transmission according to claim 1, wherein the input shaft (1) is detachably connected, via the first clutch (14), to the fourth shaft (4), and
 a first gear results from engagement of the first and the second brakes (03, 04), a second gear results from engagement of the second brake (04) and the second clutch (26), a third gear results from engagement of the second clutch (26) and the first brake (03), a fourth gear results from engagement of the second clutch (26) and the third brake (05), a fifth gear results from engagement of the second and third clutches (26, 57), a sixth gear results from engagement of the first and the second clutches (14, 26), a seventh gear results from engagement of the first and the third clutches (14, 57), an eighth gear results from engagement of the third brake (05) and the first clutch (14), and a ninth gear results from engagement of the first brake (03) and the first clutch (14).

5. The multi-speed transmission according to claim 1, wherein a reverse gear results from engagement of the second brake (04) and the third clutch (57).

6. The multi-speed transmission according to claim 1, wherein at least one one-way clutch is located within the transmission.

7. The multi-speed transmission according to claim 6, wherein the at least one one-way clutch is located between the housing (G) and one of the input shaft (1), the output (2), the third shaft (3), the fourth shaft (4), the fifth shaft (5), the sixth shaft (6) and the seventh shaft (7).

8. The multi-speed transmission according to claim 1, wherein an input and an output are located on a common side of the housing (G).

9. The multi-speed transmission according to claim 1, wherein at least one of an axle differential and a distributor differential is located one of the input shaft (1) and the output shaft (2).

10. The multi-speed transmission according to claim 1, wherein a coupling element facilitates separation of the input shaft (1) from a drive motor.

11. The multi-speed transmission according to claim 10, wherein the coupling element is one of a hydrodynamic converter, a hydraulic clutch, a dry starting clutch, a wet starting clutch, a magnetic powder clutch, and a centrifugal clutch.

12. The multi-speed transmission according to claim 1, wherein an external drive element is located downstream of the transmission, in a direction of power flow, and the input shaft (1) is firmly connected to a crankshaft of a drive motor.

13. The multi-speed transmission according to claim 1, wherein the vehicle is started via one of the at least six shifting elements (04) of the transmission, and the input shaft (1) is permanently connected to a crankshaft of the drive motor.

14. The multi-speed transmission according to claim 1, wherein a torsional vibration damper is located between a drive motor and the transmission.

15. The multi-speed transmission according to claim 1, wherein a wear-free brake is arranged on at least one of the input shaft (1), the output (2), the third shaft (3), the fourth shaft (4), the fifth shaft (5), the sixth shaft (6) and the seventh shaft (7).

16. The multi-speed transmission according to claim 1, wherein a power take-off is arranged on at least one of the input shaft (1), the output (2), the third shaft (3), the fourth shaft (4), the fifth shaft (5), the sixth shaft (6) and the seventh shaft (7) for driving an additional unit.

17. The multi-speed transmission according to claim 16, wherein the power take-off is arranged on one of the input shaft (1) and the output shaft (2).

18. The multi-speed transmission according to claim 1, wherein the six shifting elements are one of power-shift clutches and power-shift brakes.

19. The multi-speed transmission according to claim 18, wherein the six shifting elements are one of multi-disk clutches, band brakes, and cone clutches.

20. The multi-speed transmission according to claim 1, wherein the six shifting elements are one of positive brakes and positive clutches.

21. The multi-speed transmission according to claim 1, wherein an electric machine is arranged on at least one of the input shaft (1), the output (2), the third shaft (3), the fourth shaft (4), the fifth shaft (5), the sixth shaft (6) and the seventh shaft (7) as one of a generator and an additional drive unit.

* * * * *